United States Patent Office 2,722,657
Patented Nov. 1, 1955

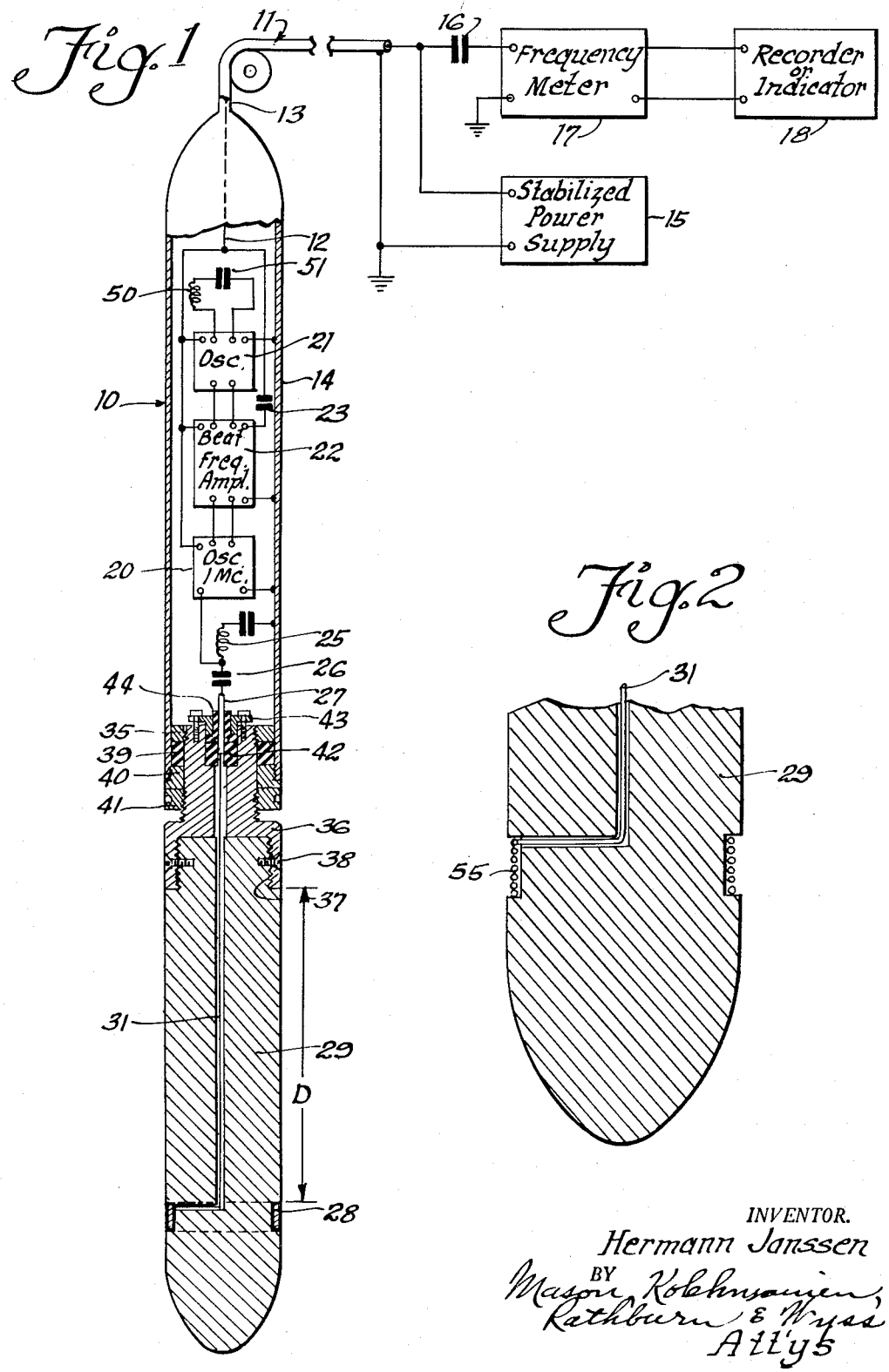

2,722,657

MEANS FOR DETECTING CHANGES IN DIELECTRIC CONSTANT OF THIN STRATA OF LITHOLOGICAL FORMATIONS TRAVERSED BY A BOREHOLE

Hermann Janssen, Kiel, Germany, assignor to Perforating Guns Atlas Corporation, Houston, Tex., a corporation of Delaware Application July 3, 1953, Serial No. 366,023

5 Claims. (Cl. 324—1)

The present invention is a continuation in part of Janssen application Serial No. 319,181 filed November 6, 1952, which is now abandoned, and relates to an improved process of detecting changes in dielectric constant of thin rock strata along a borehole, and, specifically, is an improvement on the method disclosed in Martienssen Patent No. 2,018,080.

As evidenced by the above mentioned Martienssen patent, it is known that changes of the dielectric constant of lithological strata penetrated by a borehole can be detected by lowering into the borehole a small sealed casing capable of withstanding high pressures and containing therein a suitable frequency generator or oscillator. The oscillation circuit of such oscillator is coupled to a coil or to a suitable antenna having a length of several meters, whereby the electrical characteristics of the antenna or coil are influenced by the neighboring formations to cause said oscillator to change its frequency. The changes in frequency of the oscillator are then indicative of the electrical properties of the rock terrain causing such changes. Such devices heretofore used have the disadvantage that with their aid one cannot determine the dielectric constants of thin layers having a unique dielectric constant because all the strata adjacent the entire antenna or coil influence the oscillator, so that only an average value of the electric magnitudes such as the dielectric constant is obtained of all said strata which may not vary much from that of adjacent strata even though it might include thin layers of rock or other structure having a dielectric constant quite different from that of the adjacent strata.

It is not possible to make a more specific investigation of such thin layers by reducing the length of the antenna, because in so reducing the antenna length the sensitivity of the detecting device is decreased substantially, and, more important, the measuring penetration into the strata along the borehole becomes so small that, as a practical matter, only the changes in electrical constants of the drilling or washing fluid or mud in the borehole are recorded.

It is an object of the present invention to provide an improved method of an apparatus for determining the electrical characteristics of thin strata along a borehole.

The invention, both as to its organization and method of operation, together with further objects and advantages thereof, will best be understood by reference to the following specification taken in connection with the accompanying drawing in which Fig. 1 thereof shows in a somewhat diagrammatic manner an apparatus for detecting changes in geologic strata traversed by a borehole which embodies the features of the present invention and Fig. 2 shows a portion of an alternative embodiment of the invention.

Referring to Fig. 1 of the drawing, the apparatus of the present invention comprises a subsurface unit indicated generally at 10 which is adapted to be lowered into a borehole by means of a supporting cable 11 having a central conductor 12 and an armored outer sheath 13 which is connected to the ground at the earth's surface and is connected to the housing 14 of the unit 10. A stabilized power supply 15 at the earth's surface is employed to supply power to the components within the housing 14, and signals which are produced within the subsurface unit 10 are transmitted by way of the cable 11 and the condenser 16 to a frequency meter 17, the output of which is connected to a suitable recorder or indicator 18.

Within the subsurface unit 10 there is provided a first oscillator 20 which is preferably operated at a frequency of approximately one megacycle, a second oscillator 21 which is operated at a frequency slightly different than that of the oscillator 20 whereby the beat frequency between these oscillator signals falls within the range of from zero to forty kilocycles, and a beat frequency amplifier 22 to which is supplied the output from each of the oscillators 20 and 21, the amplifier 22 impressing the beat frequency therebetween through the condenser 23 to the center conductor 12 of the cable 11. The unidirectional potential developed by the supply 15 is transmitted over the cable 11 to each of the units 20, 21 and 22 to provide energizing potential therefor. The frequency determining components of the oscillator 20 include a coil 25, preferably having from 10 to 12 turns, a condenser 26 connected to the bottom end of the coil 25 and a further capacity formed by a centrally positioned rod 27 which is connected to the condenser 26 at its upper end and is connected at its lower end to a metal cylinder 28. This metal cylinder 28 forms a part of a further condenser the compacitance of which is primarily the capacity between the cylinder 28 and the housing 14, as will be described in more detail hereinafter.

In order to determine the dielectric constant of the relatively thin layer, the cylinder 28 is insulatingly supported a substantial distance from the housing 14 by means of an elongated mandrel 29 of insulating material which is provided with a central bore 30 through which the wire 31 extends, the bottom end of the wire 31 being electrically connected to the cylinder 28. The mandrel 29 is preferably of a material having the smallest possible dielectric constant and is preferably of a maximum diameter consistent with inserting the same into the borehole. With this arrangement the high frequency field produced in the adjacent strata is distorted relative to the fields produced by prior art arrangements, so that practically all of the strata or layers along the borehole in the vicinity of the short cylindrical conductor 28 influences the measuring circuit. Preferably the cylinder 28 has a length of three or four inches and the distance D between the casing 14 and the cylinder 28 is preferably of the order of forty inches. By a suitable longitudinal extension of the cylindrical conductor 28 the thickness of the strata under investigation can be determined. Furthermore, the spacing "D" can be varied so as to change the depth of penetration into the strata along the borehole as desired.

It is important that the surface of the housing 14, which acts as the counterpoise, i. e., one plate of the measuring capacitor, remain large as compared to the surface of the conductor 28 so that the density of the lines of force at the surface of the housing is small relative to that at the surface of the conductor. If this is not the case, secondary effects will obscure the curve of the recorded changes in dielectric constant. For increasing the effective surface of the housing 14, the armored sheath 13 may be electrically connected to the housing 14 so that it effectively acts as an extension of the housing 14 and thereby increases the surface area thereof.

In order to secure the above described capacity measuring element to the bottom end of the housing 14, while maintaining the housing sealed against the entry of liquid, there is provided adjacent the bottom end of the housing 14 an internally threaded steel ring 35 into which is threaded the upper end of a steel socket 36. The socket 36 is provided with a threaded recess 37 which is adapted to receive the threaded upper end of the mandrel 29, the screws 38 being used to secure the members 36 and 29 together. Beneath the ring 35 there is provided a rubber sealing ring 39 which is compressed by means of a bronze plug member 40 which is threaded into the bottom end of the housing 14. A bronze nut 41 is tightened against the plug 40 to provide a seal between these members. A rubber seal plug 42 is provided in the upper recessed end of the member 36 within which the pin 27 is connected to the wire 31, and a stuffing box 43 containing the insulating material 44 is provided to seal the space between the pin 27 and the upper end of the member 36. With this arrangement a liquid tight seal is provided for the housing 14 while permitting the above described connection of the capacity measuring element to the electrical components within the housing.

Considering now the operation of the above described apparatus in measuring changes in the dielectric constant of strata traversed by the borehole, it will be evident that the capacitor formed by the cylinder 28 and the housing 14 is primarily influenced by changes in the dielectric constant of the strata adjacent the cylinder 28 since the mandrel 29, which is of very low dielectric constant, substantially fills the intermediate space between the housing 14 and the cylinder 28. In this connection it will be understood that the bottom portion of the member 36 effectively constitutes an extension of the housing 14 insofar as the capacity measuring element is concerned. When the capacity of the above described measuring element varies due to the changes of the dielectric constant of the strata, the frequency of the oscillator 20 varies accordingly. The frequency of the oscillator 21 is fixed so that as the frequency of the oscillator 20 varies, a beat frequency is produced in the output of the beat frequency amplifier 22 which varies in accordance with changes in the frequency of the oscillator 20. Preferably the frequency of the oscillator 21 is such that the beat frequency varies from zero to forty kilocycles with variations in the above described capacity measuring element. Thus, the frequency determining inductance 50 and a condenser 51 of the oscillator 21 are so chosen that the frequency of the oscillator 21 is of the proper value to give the above described range of beat frequencies. The beat frequency signal produced by the amplifier 22 is coupled through the condenser 23, is transmitted over the cable 11, and is coupled through the condenser 16 to the frequency meter 17 which produces a substantially direct current signal at the output terminals thereof which is proportional to the frequency of the transmitted signal. The direct current voltage developed by the frequency meter 17 is then applied to a suitable recorder or indicator 18 so as to provide a permanent record of the variations in dielectric constant of the strata traversed by the borehole. If desired suitable depth measuring equipment may be employed to correlate the data provided by the recorder 18 with the depth of the subsurface unit 10.

In Fig. 2, there is shown an alternative arrangement for the capacity measuring element wherein the cylindrical conductor 28 is replaced by a solenoid wound coil 55 of insulated wire, the upper end of which is connected to the center conductor 31 and the bottom end of which is open circuited. The coil 55 acts as one plate of the measuring condenser, the housing 14 acting as a counterpoise, i. e., the other plate of the condenser in a manner identical to that described above in connection with the apparatus shown in Fig. 1.

While there have been described what are at present considered to be the preferred embodiments of the invention, it will be understood that various changes and modifications may be made therein. It is aimed in the appended claims to cover all changes and modifications which fall within the true spirit and scope of the present invention.

What is claimed as new and desired to be secured by Letters Patent of the United States is:

1. A device for measuring the changes in dielectric constant of predominantly thin layers of different geologic strata traversed by a borehole, which comprises a conductive housing insertable into said borehole containing measuring means for measuring changes in capacity, a conductor of short longitudinal extent relative to said housing and supported from said housing, said conductor and the surface of said housing serving as the plates of a capacitor, the capacity of which varies by virtue of the surrounding lithological strata, conducting means interconnecting the measuring means in said housing and said conductor, a medium of very low dielectric constant and having the maximum thickness thereof insulating said conductor from said housing, thereby distorting the high frequency field emanating from said conductor whereby only the terrain in the vicinity of said conductor causes substantial changes in capacity measured by said measuring means.

2. A device for measuring the changes in dielectric constant of predominantly thin layers of different geologic strata traversed by a borehole, which comprises a conductive housing insertable into said borehole containing measuring means for measuring changes in capacity, an elongated body of insulating material extending from the bottom of said housing and carrying a cylindrical conductor of short longitudinal length at the bottom end thereof, said conductor being spaced from the bottom of said housing by a relatively large distance as compared to the longitudinal length of said conductor, and conducting means extending through said body and interconnecting the measuring means in said housing and said conductor, whereby the lines of force between said housing and said conductor are so distorted that only the terrain in the vicinity of said conductor causes substantial changes in the capacity measured by said measuring means.

3. A device for measuring the changes in dielectric constant of predominantly thin layers of different geologic strata traversed by a borehole, which comprises a conductive housing insertable into said borehole containing measuring means for measuring changes in capacity, an elongated body of insulating material extending from the bottom of said housing and carrying a cylindrical conductor of short longitudinal length at the bottom end thereof, said conductor comprising a solenoid wound coil having a plurality of turns of insulated wire, the longitudinal length of said coil being substantially smaller than the spacing of said coil from the bottom of said housing, and conducting means extending through said body and interconnecting the measuring means in said housing and one end of said coil, whereby the lines of force between said housing and said conductor are so distorted that only the terrain in the vicinity of said conductor causes substantial changes in the capacity measured by said measuring means.

4. A device for measuring the changes in dielectric constant of predominantly thin layers of different geologic strata traversed by a borehole, which comprises a conductive housing insertable into said borehole containing measuring means for measuring changes in capacity, an elogated body of insulating material extending from the bottom of said housing and carrying a cylindrical conductor of short longitudinal length at the bottom end thereof, said conductor comprising a solenoid wound coil having a plurality of turns of insulated wire, the longitudinal length of said coil being substantially smaller than the spacing of said coil from the bottom of said housing, and conducting means extending through said body and interconnecting the measuring means in said housing and one end of said coil, the other end of said coil being open circuited and well insulated from said housing, whereby the lines of force between said housing and said conductor are so distorted that only the terrain in the vicinity of said conductor causes substantial changes in the capacity measured by said measuring means.

5. A device for measuring the changes in dielectric constant of predominantly thin layers of different geologic strata traversed by a borehole comprising, a conductive housing insertable into said borehole, measuring means for measuring changes in capacity contained within said housing, a conductor of short longitudinal extent relative to said housing mechanically attached to said housing but electrically insulated therefrom whereby said conductor and the surface of said housing serve as the plates of a capacitor the capacity of which varies by virtue of the lithological strata surrounding the borehole into which said housing is inserted, insulating means of substantially the maximum cross sectional dimension consistent with inserting the same into said borehole for separating said plates thereby distorting any high frequency field existing between the plates of said capacitor whereby only the terrain in the vicinity of said conductor causes changes in capacity between said plates, and means for connecting said measuring means to the plates of said capacitor thereby to measure any changes in capacity.

References Cited in the file of this patent

UNITED STATES PATENTS

| | | |
|---|---|---|
| 1,976,904 | Terman | Oct. 16, 1934 |
| 2,018,080 | Martienssen | Oct. 22, 1935 |
| 2,197,493 | Ellis et al. | Apr. 16, 1940 |
| 2,246,460 | Bazzoni et al. | June 17, 1941 |
| 2,285,152 | Firestone | June 2, 1942 |
| 2,398,800 | Millington | Apr. 23, 1946 |